(12) United States Patent
Rautenbach et al.

(10) Patent No.: US 10,040,558 B2
(45) Date of Patent: *Aug. 7, 2018

(54) CONNECTION BOX ASSEMBLIES FOR AN AIRCRAFT EVACUATION SLIDE CABLE CONNECTION AND OVERWING DOOR ACTUATION SYSTEM INTERFACE AND METHODS FOR CONNECTING AN EVACUATION SLIDE ACTUATION CABLE WITH A CONNECTION BOX ASSEMBLY

(71) Applicant: GOODRICH CORPORATION, Charlotte, NC (US)

(72) Inventors: Helperus Ritzema Rautenbach, Scottsdale, AZ (US); Ryan Schmidt, Gilbert, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 427 days.

This patent is subject to a terminal disclaimer.

(21) Appl. No.: 14/971,696

(22) Filed: Dec. 16, 2015

(65) Prior Publication Data

US 2017/0174351 A1    Jun. 22, 2017

(51) Int. Cl.
*H05K 7/02* (2006.01)
*B64D 25/14* (2006.01)
(Continued)

(52) U.S. Cl.
CPC .......... *B64D 25/14* (2013.01); *H01R 13/447* (2013.01); *H01R 13/5205* (2013.01);
(Continued)

(58) Field of Classification Search
CPC .......... H01R 13/447; H01R 13/453; H01R 13/4534; H01R 13/46; H01R 13/5205;
(Continued)

(56) References Cited

U.S. PATENT DOCUMENTS

| 9,755,347 B2* | 9/2017 | Rautenbach ........... B64D 25/14 |
| 2004/0094671 A1 | 5/2004 | Moro et al. |
| 2007/0199499 A1 | 8/2007 | Hughes |

FOREIGN PATENT DOCUMENTS

DE    29507204    8/1995

OTHER PUBLICATIONS

Extended European Search Report dated Apr. 25, 2017 in European Application No. 16204729.4.

* cited by examiner

*Primary Examiner* — Angel R Estrada
(74) *Attorney, Agent, or Firm* — Snell & Wilmer, L.L.P.

(57) ABSTRACT

A connection box assembly configured to connect an evacuation slide actuation cable of an evacuation slide actuation system to an evacuation slide inflation system is provided. The connection box assembly comprises a connection box, a connection box lid coupled to the connection box and configured to slide between an open position and a closed position, and a connection box slider disposed within the connection box. The connection box slider is positioned to receive a first cable end of the evacuation slide actuation cable when the connection box lid is in the open position. The connection box lid in the closed position closes the connection box to retain and seal the connection box slider and the first cable end inside the connection box assembly.

20 Claims, 11 Drawing Sheets

(51) Int. Cl.
*H01R 43/00* (2006.01)
*H01R 13/52* (2006.01)
*H01R 43/16* (2006.01)
*H01R 13/447* (2006.01)

(52) U.S. Cl.
CPC .......... *H01R 43/005* (2013.01); *H01R 43/16* (2013.01); *H01R 2201/26* (2013.01)

(58) Field of Classification Search
CPC ........ H01R 13/52; H01R 13/53; H01R 43/16; H01R 2201/26; H01R 2201/00; H01R 43/00; B64D 25/14; B64D 25/00; H02G 3/08; H02G 3/081; H05K 5/00; H05K 5/02; H05K 5/0247; H05K 7/00; H05K 7/02
USPC .......... 174/50, 541, 520, 535, 542, 559, 59; 220/3.2–3.9, 4.02; 182/70, 48, 49, 148, 182/149; 244/137.2, 905
See application file for complete search history.

CONNECTION BOX ASSEMBLIES FOR AN AIRCRAFT EVACUATION SLIDE CABLE CONNECTION AND OVERWING DOOR ACTUATION SYSTEM INTERFACE AND METHODS FOR CONNECTING AN EVACUATION SLIDE ACTUATION CABLE WITH A CONNECTION BOX ASSEMBLY

FIELD

The present disclosure relates generally to aircraft evacuation slides. More particularly, the present disclosure relates to connection box assemblies for an aircraft evacuation slide cable connection and overwing door actuation system interface and methods for connecting an evacuation slide actuation cable with a connection box assembly.

BACKGROUND

Commercial aircraft typically employ inflatable evacuation slides that deploy beneath exit doors during evacuation. The evacuation slides may be used in case of emergency by passengers exiting the aircraft. A fuselage-mounted evacuation slide may be stowed in a container (i.e., a packboard) located underneath or below the exit close to the aircraft exterior.

Prior to departure (usually before engine startup), all the aircraft doors are placed into the "armed" mode. If a rapid evacuation is required and the doors are opened while "armed", the opening of the door initiates evacuation slide inflation. In order to ensure that inflation begins when the aircraft door is opened while armed, a fuselage-mounted evacuation slide actuation cable is connected by a connection box to the aircraft. Conventional connection boxes are generally rectangular and include hinged lids that swing open and closed and are sealed with a gasket.

SUMMARY

A connection box assembly configured to connect an evacuation slide actuation cable of an evacuation slide actuation system to an evacuation slide inflation system provided, according to various embodiments. The connection box assembly comprises a connection box, a connection box lid coupled to the connection box, and a connection box slider disposed within the connection box. The connection box lid is configured to slide between an open position and a closed position. The connection box slider is positioned to receive a first cable end of the evacuation slide actuation cable when the connection box lid is in an open position. The connection box lid in the closed position closes the connection box to retain and seal the connection box slider and the first cable end inside the connection box assembly.

An emergency evacuation slide and overwing door actuation system interface is provided, according to various embodiments. The interface comprises an evacuation slide actuation cable comprising a first cable end and a connection box assembly. The connection box assembly comprises a connection box, a connection box lid coupled to the connection box, and a connection box slider disposed within the connection box. The connection box lid is configured to slide between an open position and a closed position. The connection box slider is positioned to receive a first cable end of the evacuation slide actuation cable when the connection box lid is in an open position. The connection box lid in the closed position closes the connection box to retain and seal the connection box slider and the first cable end inside the connection box assembly.

A method is provided for connecting an evacuation slide actuation cable having a first cable end to a connection box assembly of an emergency evacuation slide and overwing door actuation system interface, according to various embodiments. The method comprises coupling the first cable end to a connection box slider disposed in a connection box of the connection box assembly. The connection box assembly further comprises a connection box lid configured to be slidable, after the first cable end is coupled, from an open position to a closed position. The connection box lid is slid to a closed position to close the connection box for retaining and sealing the connection box slider and the first cable end inside the connection box assembly.

In any of the foregoing embodiments, the connection box and the connection box lid each comprise inner and outer concentric substantially hollow cylinders. The connection box and the connection box lid cooperatively define a circular interface for receiving a first O-ring seal for environmentally sealing the connection box assembly. The connection box lid includes a cable installation slot for receiving the first cable end. The connection box lid includes a viewing window configured to be used for visually verifying connection of the first cable end of the evacuation slide actuation cable with the connection box assembly. The connection box slider includes a first safety pin opening and the connection box lid includes a second safety pin opening, the first safety pin opening configured to receive a safety pin during connection of the first cable end with the connection box assembly and the second safety pin opening configured to receive the safety pin when the connection box lid is in the closed position to prevent axial movement of the connection box slider. The connection box has an open second end configured for insertion of the first cable end into the connection box, thereby closing the second end of the connection box. The first cable end comprises a cable interface connector including an engagement feature and the connection box has a spring-loaded plunger configured to engage the engagement feature in response to the first cable end being inserted into the open second end of the connection box. The connection box further comprises a sealing groove for receiving an o-ring seal for sealing an interface between the connection box and the cable interface connector. Coupling the first cable end comprises inserting the first cable end into an open end of the connection box and inserting the first cable end into a cable installation slot in the connection box slider. The first cable end comprises a rigid ball end and a cable interface connector spaced apart by a free cable length, the cable interface connector having an engagement feature and the connection box including a spring-loaded plunger, and inserting the first cable end into the open end of the connection box comprises engaging the spring-loaded plunger with the engagement feature of the cable interface connector. That the first cable end of the evacuation slide actuation cable is retained and sealed inside the connection box slider is verified visually through a viewing window in the connection box lid.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Various embodiments are directed to connection box assemblies for an aircraft evacuation slide cable connection and overwing door actuation system interface and methods for connecting an evacuation slide actuation cable with a connection box assembly. Various embodiments provide improved and easier retention and sealing (also referred to herein as "connection" or "installation") of a first cable end of the evacuation slide actuation cable inside the connection box assembly. As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As known in the art, an evacuation slide is an inflatable slide used to evacuate an aircraft quickly. The evacuation slide is packed and held within a packboard 4 (FIG. 1) disposed in the aircraft fuselage over a wing such that passengers exiting an emergency exit door would exit onto the wing. An evacuation slide may be disposed aft of the emergency exit door. An access panel may cover the packboard. An evacuation slide assembly 108 may jettison the access panel and deploy the inflatable evacuation slide in response to the emergency exit door opening. The inflatable evacuation slide may be used during aircraft evacuation, as well as evacuation for ships and building structures, according to various embodiments.

Figure 1:
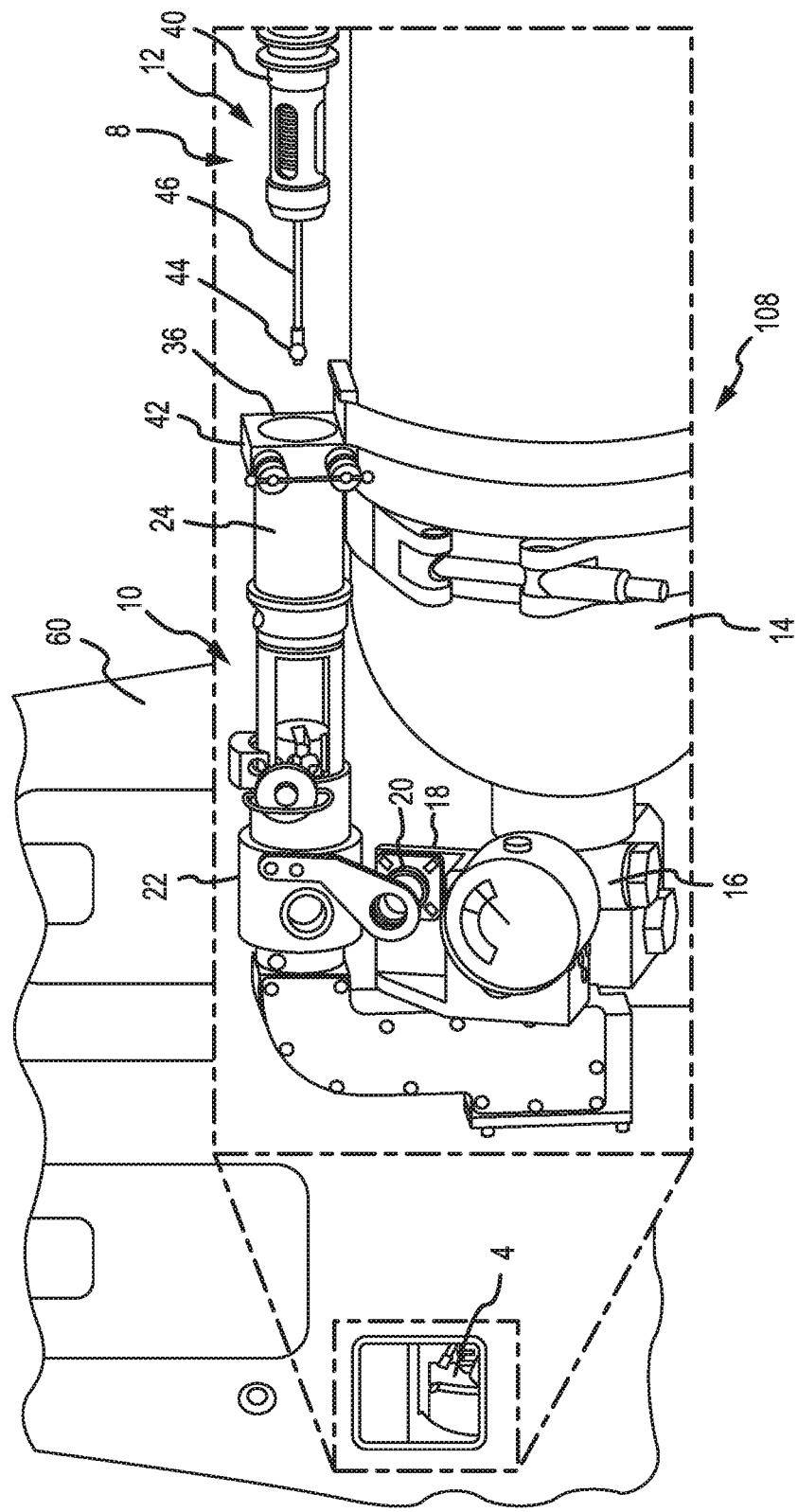
FIG. 1 is a diagram of a packboard in a wing to fuselage fairing for stowing a fuselage-mounted evacuation slide and a connection box assembly, the connection box assembly acting as an interface between a first cable end of an evacuation slide actuation cable and an evacuation slide inflation system, the connection box assembly illustrated with a connection box lid thereof in an open position, according to various embodiments.
Figure 5:
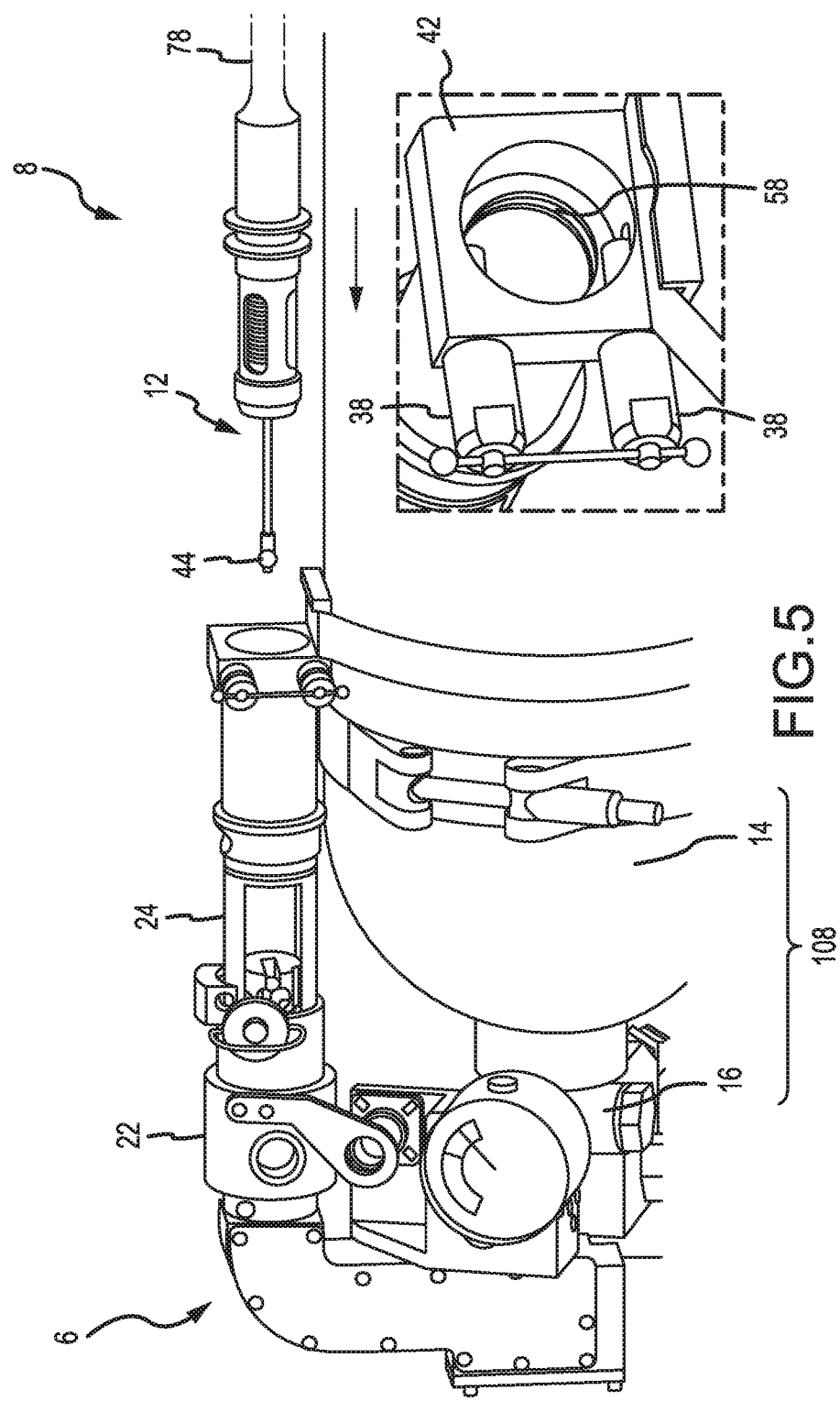
FIG. 5 is a diagram illustrating insertion of the first cable end into an open second end of the connection box and an enlarged view of the open second end of the connection box including a pair of spring-loaded plungers, according to various embodiments.

With reference to FIG. 1, according to various embodiments, the evacuation slide assembly is shown as viewed from a bottom of the aircraft with the access panel removed from an aircraft wing to fuselage fairing 60. The dotted line rectangle illustrates a view into the open packboard 4. An emergency evacuation slide may be released from the packboard 4 using various techniques. The mechanical interface between the offwing emergency evacuation slide assembly 108 and manual handle to an overwing door inflation actuation system interface is depicted. The overwing door inflation actuation system 6 (FIG. 5) comprises an evacuation slide actuation cable, a first cable end 12 of which is depicted in FIG. 5 and hereinafter described. The evacuation slide actuation cable 8 routes through the aircraft and interfaces with a connection box assembly 10 at the first cable end 12 and a manual inflation handle on the aircraft at an opposite, second cable end. The evacuation slide is activated in response to the overwing emergency exit doors being opened. The door opening pulls the first cable end 12 of the evacuation slide actuation cable 8, permitting inflation of the evacuation slide.

Still referring to FIG. 1 and now to FIGS. 5 through 11, the evacuation slide inflation system 108 includes the connection box assembly 10 that acts as an interface between the evacuation slide actuation cable 8 and the evacuation slide inflation system 108. The evacuation slide inflation system 108 comprises a charged cylinder 14 that provides pressurized gas to inflate the evacuation slide. A mounting platform 18 may be mounted on a regulator valve 16 of the evacuation slide inflation system 108 (FIG. 5) and be operatively connected to the charged cylinder 14. An electrical connector 20 may extend from the mounting platform 18 of the inflation system. The electrical connector 20 may be oriented perpendicular from the mounting platform 18. The electrical connector 20 is configured to be connected to an electrical harness from the aircraft. Connection of the electrical harness to the electrical connector enables electronic pressure monitoring of the charged cylinder 14.

Figure 2:
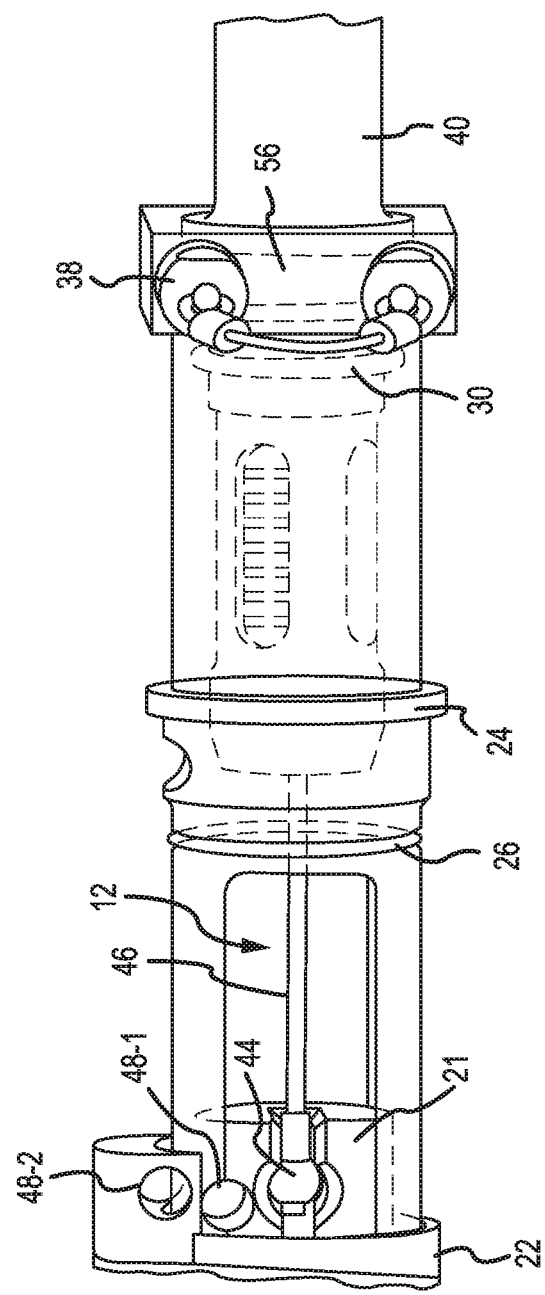
FIG. 2 is a diagram illustrating an interface between the connection box assembly of FIG. 1 (the connection box lid thereof in the open position) and the first cable end of the evacuation slide actuation cable, according to various embodiments.
Figure 3:
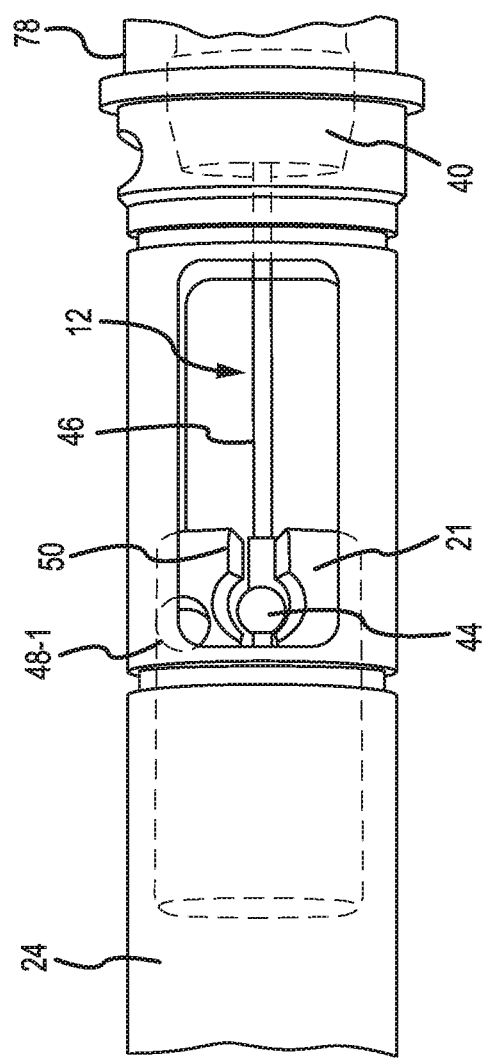
FIG. 3 is a diagram illustrating a cable installation slot in a connection box slider for receiving a rigid ball end of the first cable end, according to various embodiments.
Figure 8:
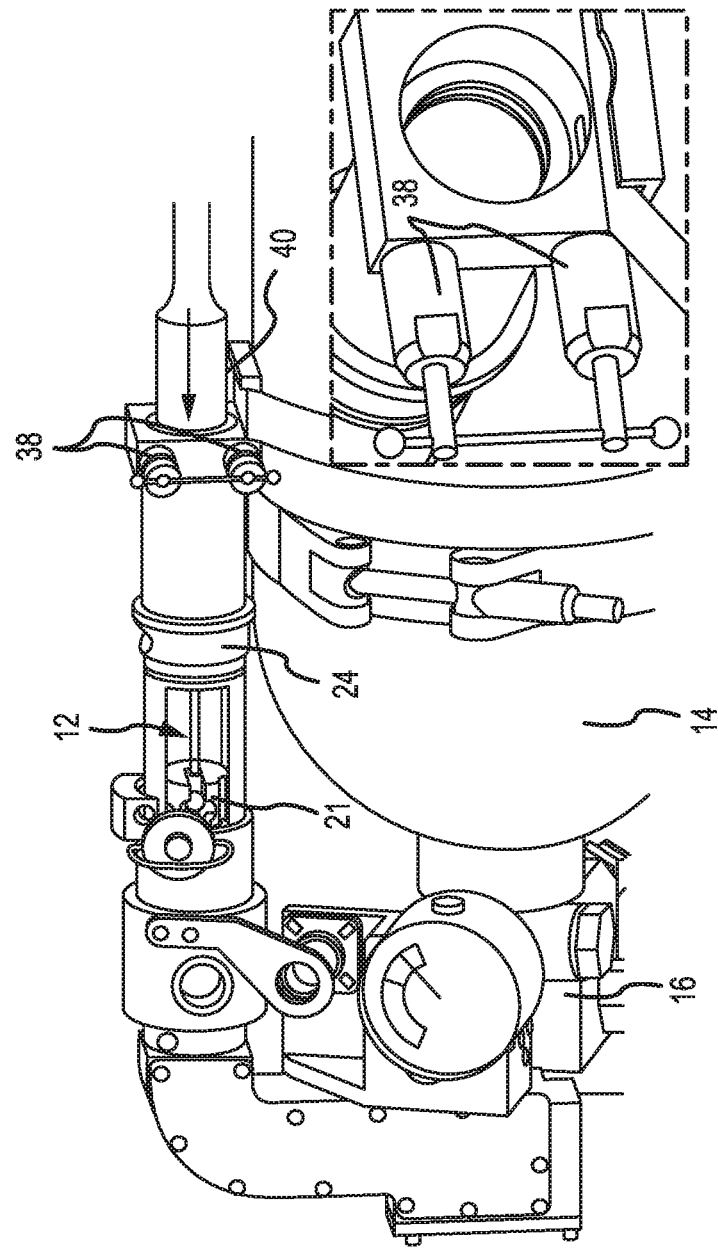
Figure 9:
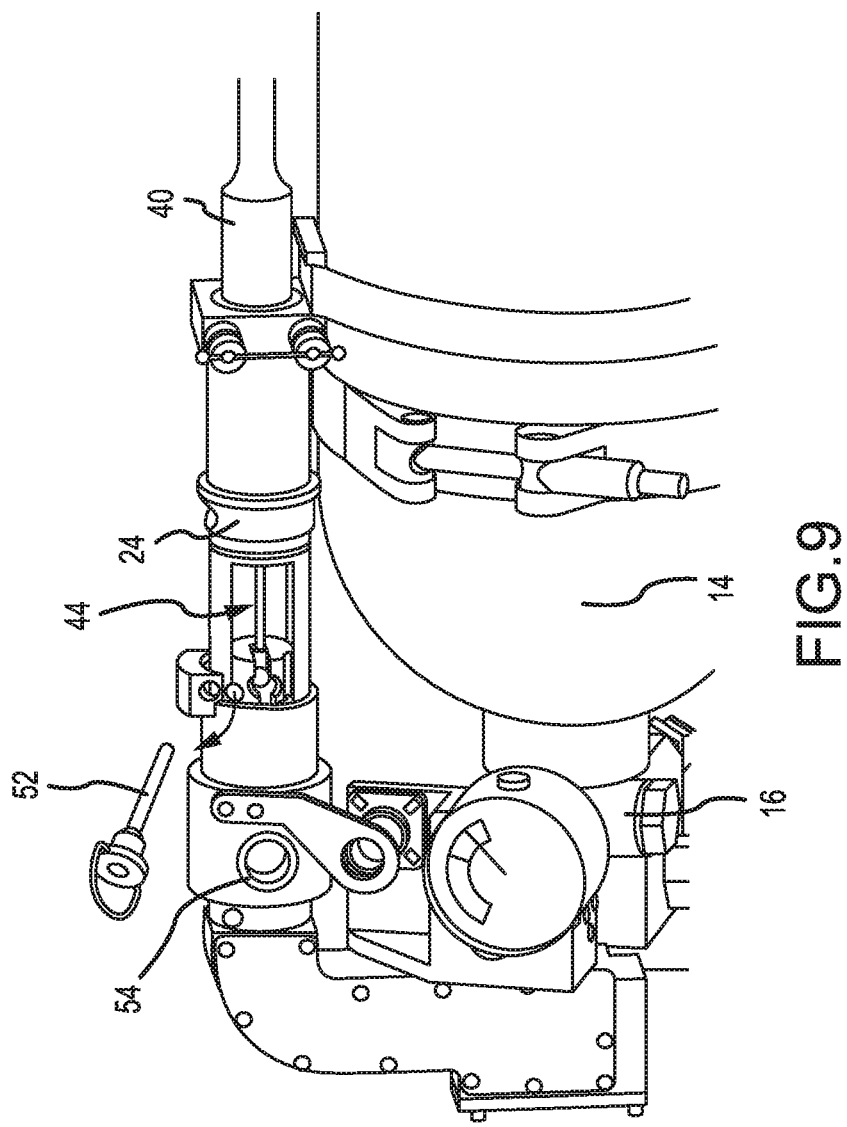
FIG. 9 illustrates removal of a safety pin from a first safety pin opening in the connection box slider with the connection box lid in the open position, according to various embodiments.
Figure 10:
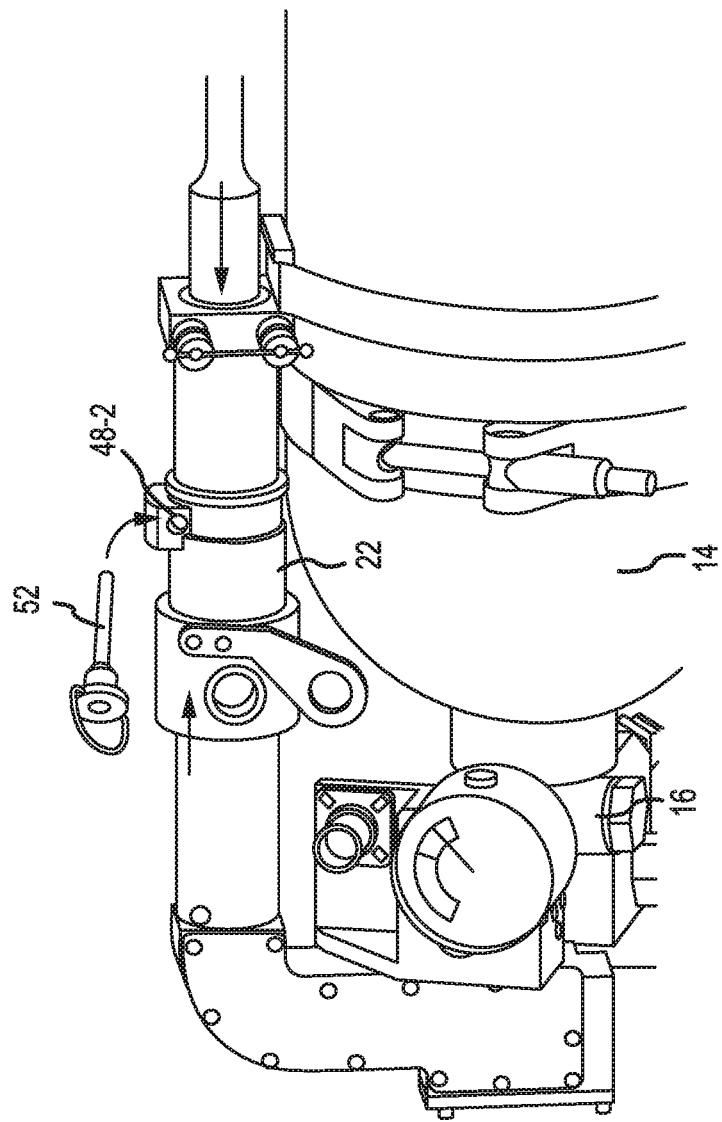
FIG. 10 illustrates sliding the connection box lid to a closed position and inserting the safety pin in a second safety pin opening thereof, according to various embodiments.

Still referring to FIGS. 1, 5 through 11, and now to FIGS. 2 and 3, according to various embodiments, the connection box assembly 10 comprises the connection box lid 22 coupled to a connection box 24. A connection box slider 21 is disposed within the connection box 24. The connection box slider 21 is movable by pulling the first cable end 12 of the evacuation slide actuation cable 8 to initiate the evacuation slide inflation system 108. The connection box slider 21 is positioned to receive the first cable end 12 of the evacuation slide actuation cable 8 when the connection box lid 22 is in an open position. The connection box lid 22 is configured to slide to a closed position (as shown in FIG. 10) covering the connection box 24 to retain and seal the first cable end 12 and the connection box slider 21 inside the connection box assembly 10.

Figure 11:
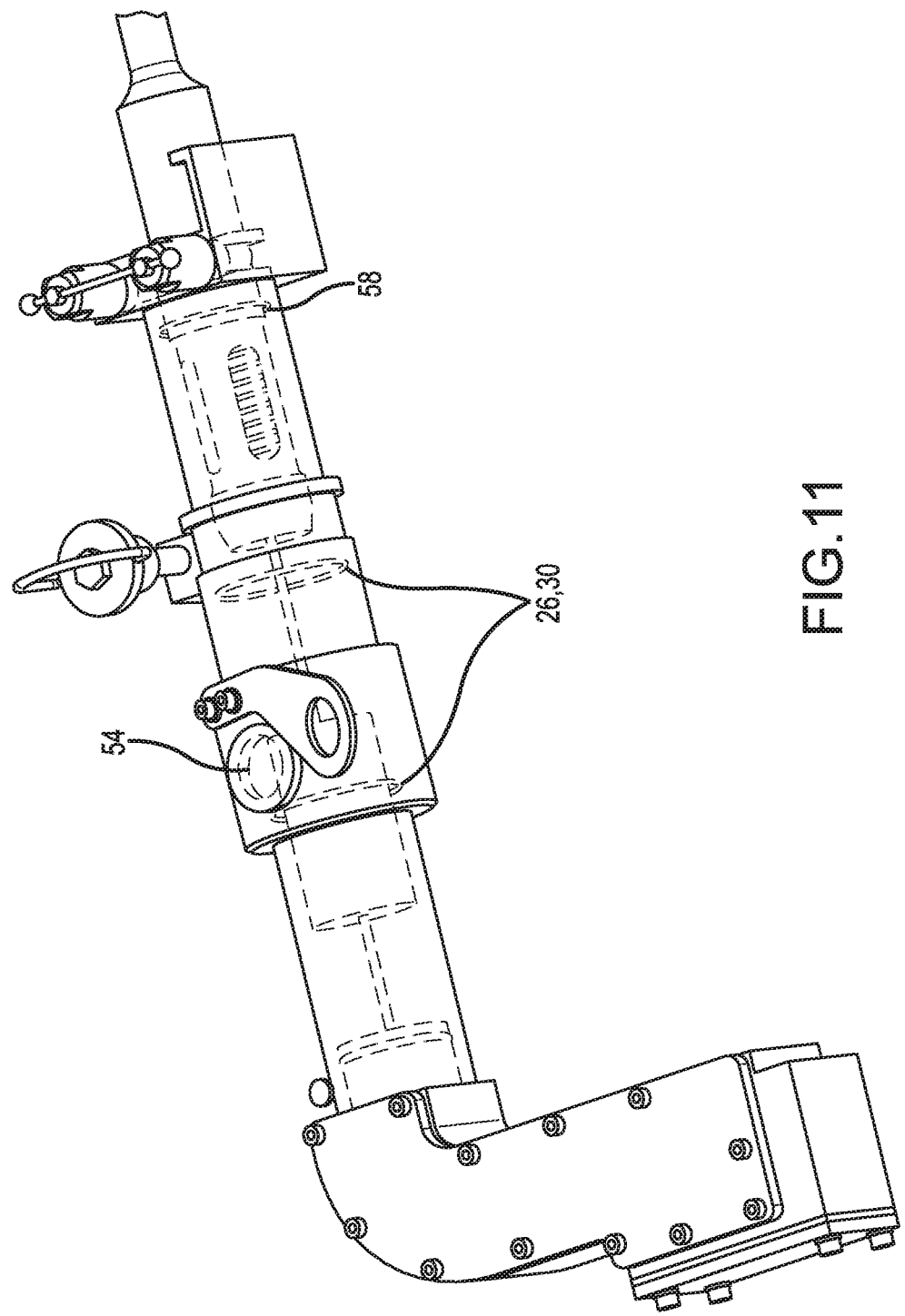
FIG. 11 illustrates the position of a plurality of O-ring seals at various connection box interfaces, according to various embodiments.

While a connection "box" lid 22 and connection "box" 24 have been described, it is to be understood that each is generally cylindrical. More particularly, the connection box lid 22 and the connection box 24 respectively comprise outer and inner concentric substantially hollow cylinders of different operable size. The connection box 24 is of smaller diameter than the connection box lid 22. Referring now briefly to FIG. 11, the connection box lid 22 and the connection box 24 cooperatively define a circular interlace for receiving a first O-ring seal 26 and a second O-ring seal 30 between the connection box lid 22 and the connection box 24. When the connection box lid 22 is in the closed position and the first and second O-ring seals 26 and 30 are in position, the connection box assembly 10 according to various embodiments is environmentally sealed against contaminants. The first cable end 12 of the evacuation slide actuation cable 8 is retained and sealed within the connection box assembly 10 when the connection box lid 22 is in the closed position. The connection box 24 has a first end 34 proximate the connection box lid 22 in an open position and an open second end 36. The open second end 36 of the connection box 24 is configured to be sealed with insertion of the first cable end 12 as herein described.

Still referring to FIGS. 1, 2, and 5 through 11, the connection box open second end 36 includes one or more spring-loaded plungers 38 configured to help retain a cable interface connector 40 of the first cable end 12 in the connection box 24. The one or more spring-loaded plungers 38 extend outwardly from a bridge 42 at the connection box second end 36. While two spring-loaded plungers 38 are depicted in the illustrated embodiment, it is to be understood that a fewer or a greater number of spring-loaded plungers may be used.

As noted previously, the connection box lid 22 is coupled to the connection box 24 and the connection box slider is positioned to receive the first cable end 12 of the evacuation slide actuation cable 8 when the connection box lid 22 is in an open position. The connection box lid 22 is also configured to slide to a closed position closing the connection box 24 to retain and seal the first cable end 12 and the connection box slider 21 inside the connection box assembly 10. The connection box lid 22 can also slide in the opposite direction, from the closed position to the open position, for removal of the first cable end 12 of the evacuation slide actuation cable 8. The first cable end 12 of the evacuation slide actuation cable 8 comprises a housing 78 that includes the cable interface connector 40 connected to a rigid ball end 44 by a free cable length 46.

The connection box slider 21 includes a first safety pin opening 48-1 and a cable installation slot 50 (FIG. 3). The connection box lid 22 includes a second safety pin opening 48-2 (FIGS. 2 and 10). The first safety pin opening 48-1 in the connection box slider 21 is configured to receive a safety pin 52 during connection of the first cable end 12 of the evacuation slide actuation cable 8 with the connection box assembly 10, thereby preventing inflation system initiation by preventing axial movement of the connection box slider 21. The cable installation slot 50 (FIG. 3) may be shaped like a keyhole to receive the rigid ball end 44 and a portion of the free cable length 46. The connection box slider 21 is configured to move axially (slide) within the connection box assembly 10 to permit initiation of the evacuation slide inflation system 108 when the evacuation slide is activated in response to the overlying emergency exit doors being opened.

The connection box lid 22 may include a viewing window 54. The viewing window may be used to visually verify from the packboard 4 that the evacuation slide actuation cable 8 (more particularly, the rigid ball end 44 of the cable first end 12) has been properly connected with the connection box assembly 10.

As noted previously, the first cable end 12 of the evacuation slide actuation cable 8 comprises the housing 78 for the cable interface connector 40 connected to the rigid ball end 44 by the free cable length 46. The cable interface connector 40 may be cylindrical and includes an engagement feature 56 on an exterior surface. The cable interface connector 40 fits into the connection box 24 with the one or more spring-loaded plungers 38 at the open second end 36 of the connection box 24 engaging the engagement feature 56 on the cable interface connector 40. A third O-ring seal 58 on the connection box 24 interfaces with the cable interface connector 40 (FIG. 11) to further ensure an environmental seal of the connection box assembly when the connection box lid 22 is in the closed position. The free cable length 46 protrudes beyond the cable interface connector 40 and is configured to be inserted into the cable installation slot 50 in the connection box slider 21 (FIG. 3). The free cable length 46 cannot be extended beyond its adjusted length (i.e., pulled out of the cable interface connector further) due to a stop feature in the cable interface connector 40.

Figure 4:
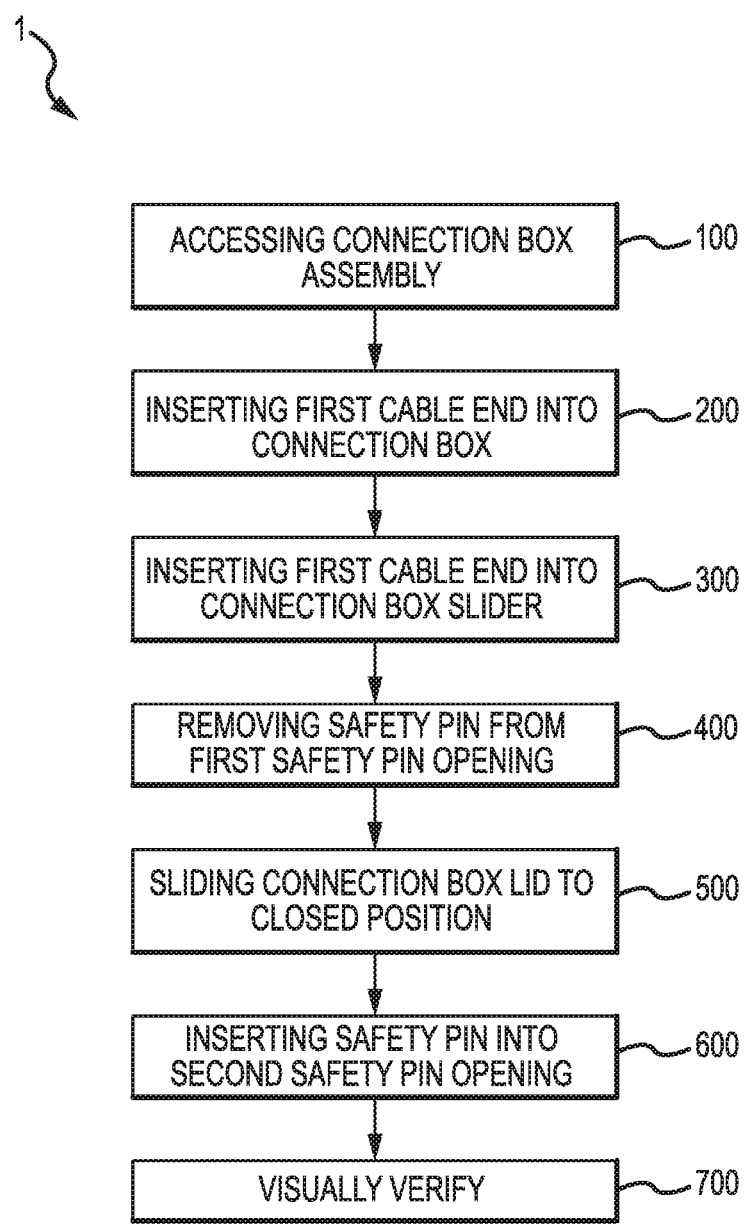
FIG. 4 is a flow diagram of a method for connecting an evacuation slide actuation cable to a connection box assembly, according to various embodiments.

Referring now to FIG. 4 and still referring to FIGS. 5 through 11, according to various embodiments, a method 1 for connecting the evacuation slide actuation cable with the connection box assembly of the emergency evacuation slide and overwing door actuation system interface begins by accessing the connection box assembly 10 on the packboard 4 in the wing to fuselage fairing 60 (step 100). The evacuation slide actuation cable 8 (more particularly, the second cable end) is connected to the manual inflation handle prior to connection of the evacuation slide actuation cable (more particularly, the first cable end 12) with the connection box assembly 10 to avoid inadvertent evacuation slide deployment. Connecting the first cable end 12 with the connection box assembly 10 arms the evacuation slide actuation system.

Figure 6:
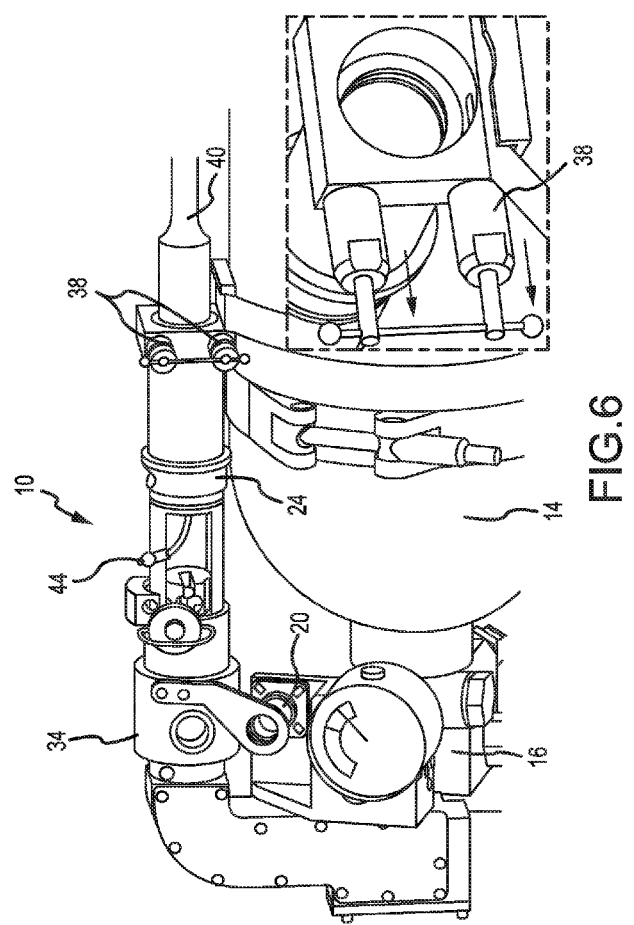
FIG. 6 illustrates pulling the one or more spring-loaded plungers at the open second end of the connection box to retain a cable interface connector of the first cable end (partially shown) in the connection box, according to various embodiments.

Still referring to FIG. 4, and now specifically to FIG. 5, the method 1 for installing the evacuation slide actuation cable in the connection box assembly continues by inserting the first cable end into the connection box (step 200). As noted previously, the first cable end 12 includes the cable interface connector 40 with the engagement feature 56 on the exterior surface thereof. The spring-loaded plungers 38 at the open second end 36 of the connection box 24 are pulled to allow the cable interface connector 40 to "bottom out" in the connection box 24 as shown in FIG. 6.

Figure 7:
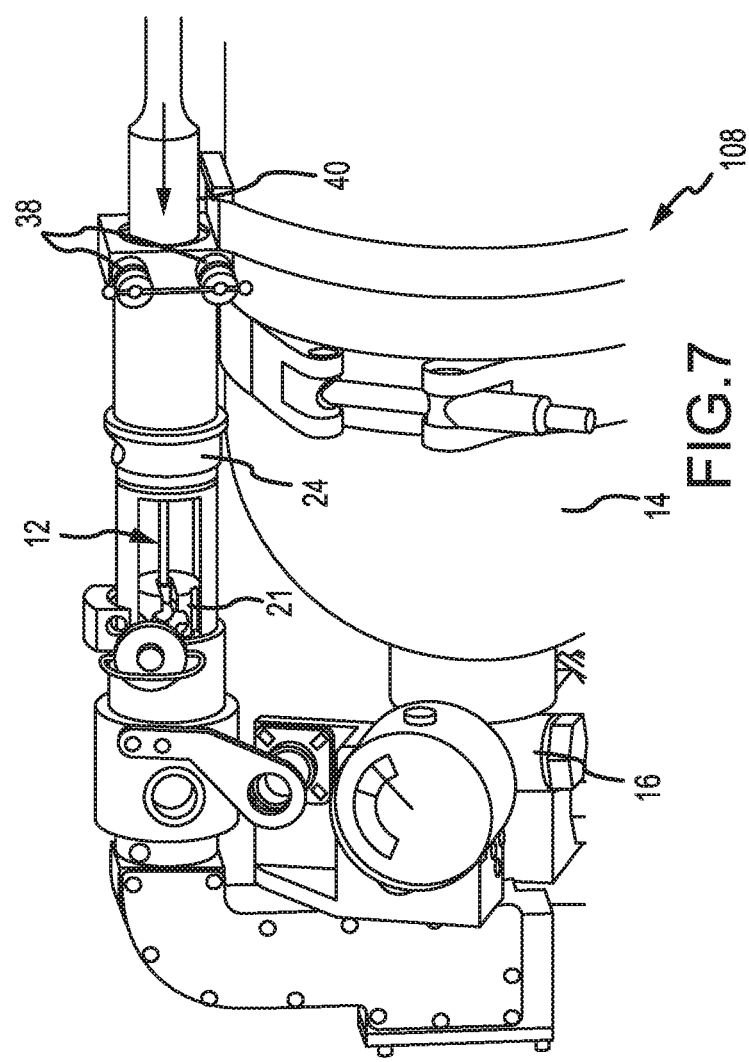
FIGS. 7 and 8 respectively illustrate insertion of the first cable end into the cable installation slot in the connection box slider (FIG. 3) with the connection box lid in the open position and a light pull on the spring-loaded plungers to ensure engagement of the spring-loaded plungers on an engagement feature of the cable interface connector, according to various embodiments.

Still referring to FIG. 4, and now specifically to FIG. 7, according to various embodiments, the method 1 for installing the evacuation slide actuation cable 8 to the connection box assembly of the emergency evacuation slide and overwing door actuation system interface continues by inserting the first cable end 12 into the connection box slider 21 (step 300). With the cable interface connector 40 inside the connection box 24, the spring-loaded plungers 38 are released. The first cable end 12 (more particularly, the rigid ball end 44 and a portion of the free cable length 46) is inserted into the connection box slider 21 as shown in FIG. 3 (more particularly, into the cable installation slot 50 in the connection box slider 21). To ensure that the spring-loaded plungers 38 are engaged with the engagement feature 56 on the cable interface connector 40, the cable interface connector 40 may be lightly pulled away from the connection box slider 21 as shown in FIG. 8. The cable interface connector 40 is retained inside the connection box 24 by the spring-loaded plungers 38 to ensure that the first cable end 12 is not under tension, thereby avoiding inadvertent deployment of the evacuation slide. The safety pin 52 inserted through the first safety pin opening 48-1 in the connection box slider 21 also prevents inflation system initiation.

Still referring to FIG. 4, and now specifically to FIGS. 9 and 10, according to various embodiments, the method 1 for installing the evacuation slide actuation cable to a connection box assembly continues by removing the safety pin 52 from the first safety pin opening 48-1 in the connection box slider 21 (step 400), then sliding the connection box lid 22 to the closed position (step 500) as shown in FIG. 10, and then inserting the safety pin 52 into the second safety pin opening 48-2 in the connection box lid in the closed position (step 600), thereby completing connection (i.e., installation) of the connection box assembly 10 with the evacuation slide actuation cable 8 (more particularly, the first cable end 12 thereof), wherein the connection box slider and the first cable end are retained and sealed inside the connection box assembly. The viewing window 54 in the connection box lid 22 may be used to visually verify (step 700) that the first cable end 12 of the evacuation slide actuation cable 8 has been properly installed (i.e., retained and sealed inside the connection box assembly when the connection box lid is in the closed position).

From the foregoing, it is to be appreciated that various embodiments provide improved and easier retention and sealing of the first cable end of the evacuation slide actuation cable inside the connection box assembly, thereby better ensuring that the evacuation slide will begin to inflate if the emergency exit door is opened in the armed condition.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A connection box assembly configured to connect an evacuation slide actuation cable of an evacuation slide actuation system to an evacuation slide inflation system, the connection box assembly comprising:
   a connection box; and
   a connection box lid coupled to the connection box and configured to slide between an open position and a closed position; and
   a connection box slider disposed within the connection box and positioned to receive a first cable end of the evacuation slide actuation cable when the connection box lid is in the open position, wherein the connection box lid in the closed position closes the connection box to retain and seal the connection box slider and the first cable end inside the connection box assembly.

2. The connection box assembly of claim 1, wherein the connection box and the connection box lid each comprise inner and outer concentric substantially hollow cylinders.

3. The connection box assembly of claim 2, wherein the connection box and the connection box lid cooperatively define a circular interface for receiving a first O-ring seal for environmentally sealing the connection box assembly.

4. The connection box assembly of claim 1, wherein the connection box slider includes a cable installation slot for receiving the first cable end.

5. The connection box assembly of claim 1, wherein the connection box lid includes a viewing window configured to be used for visually verifying connection of the first cable end of the evacuation slide actuation cable with the connection box assembly.

6. The connection box assembly of claim 1, wherein the connection box slider includes a first safety pin opening and the connection box lid includes a second safety pin opening, the first safety pin opening configured to receive a safety pin during connection of the first cable end with the connection box assembly and the second safety pin opening configured to receive the safety pin when the connection box lid is in the closed position to prevent axial movement of the connection box slider.

7. The connection box assembly of claim 1, wherein the connection box has an open second end configured for insertion of the first cable end into the connection box, thereby closing the second end of the connection box.

8. The connection box assembly of claim 7, wherein the first cable end comprises a cable interface connector including an engagement feature and the connection box has a spring-loaded plunger configured to engage the engagement feature in response to the first cable end being inserted into the open second end of the connection box.

9. The connection box assembly of claim 8, wherein the connection box further comprises a sealing groove for receiving an o-ring seal for sealing an interface between the connection box and the cable interface connector.

10. An emergency evacuation slide and overwing door actuation system interface comprising:
  an evacuation slide actuation cable comprising a first cable end; and
  a connection box assembly comprising:
    a connection box;
    a connection box lid coupled to the connection box and configured to slide between an open position and a closed position; and
    a connection box slider disposed within the connection box and positioned to receive a first cable end of the evacuation slide actuation cable when the connection box lid is in the open position, wherein the connection box lid in the closed position closes the connection box to retain and seal the connection box slider and the first cable end inside the connection box assembly.

11. The emergency evacuation slide and overwing door actuation system interface of claim 10, wherein the connection box and the connection box lid each comprise inner and outer concentric substantially hollow cylinders of different operable sizes and cooperatively define a circular interface for receiving an O-ring seal for environmentally sealing the connection box assembly.

12. The emergency evacuation slide and overwing door actuation system interface of claim 10, wherein the connection box slider includes a cable installation slot for receiving the first cable end.

13. The emergency evacuation slide and overwing door actuation system interface of claim 10, wherein the connection box lid includes a viewing window configured for visually verifying connection of the first cable end of the evacuation slide actuation cable with the connection box assembly.

14. The emergency evacuation slide and overwing door actuation system interface of claim 10, wherein the connection box slider includes a first safety pin opening and the connection box lid includes a second safety pin opening, the first safety pin opening configured to receive a safety pin during connection of the first cable end with the connection box assembly and the second safety pin opening configured to receive the safety pin when the connection box lid is in the closed position to prevent axial movement of the connection box slider.

15. The emergency evacuation slide and overwing door actuation system interface of claim 10, wherein the connection box has an open second end configured for insertion of the first cable end into the connection box.

16. The emergency evacuation slide and overwing door actuation system interface of claim 15, wherein the first cable end comprises a cable interface connector including an engagement feature and the connection box has a spring-loaded plunger configured to engage the engagement feature in response to the first cable end being inserted into the open second end of the connection box.

17. A method for connecting an evacuation slide actuation cable having a first cable end to a connection box assembly of an emergency evacuation slide and overwing door actuation system interface, the method comprising:
  coupling the first cable end to a connection box slider disposed in a connection box of the connection box assembly, the connection box assembly further comprising a connection box lid configured to be slidable from an open position when the first cable end is coupled to the connection box slider to a closed position; and
  sliding the connection box lid to the closed position to close the connection box for retaining and sealing the connection box slider and the first cable end inside the connection box assembly.

18. The method of claim 17, further comprising inserting the first cable end into an open end of the connection box prior to coupling the first cable end to the connection box slider and coupling the first cable end to the connection box slider comprises inserting the first cable end into a cable installation slot in the connection box slider.

19. The method of claim 18, wherein the first cable end comprises a rigid ball end and a cable interface connector spaced apart by a free cable length, the cable interface connector having an engagement feature and the connection box including a spring-loaded plunger, and inserting the first cable end into the open end of the connection box comprises engaging the spring-loaded plunger with the engagement feature of the cable interface connector.

20. The method of claim 17, further comprising verifying visually through a viewing window in the connection box lid that the first cable end of the evacuation slide actuation cable is retained and sealed inside the connection box assembly.

* * * * *